United States Patent
Kanei et al.

(10) Patent No.: US 11,403,388 B2
(45) Date of Patent: Aug. 2, 2022

(54) ASSIGNMENT DEVICE, ASSIGNMENT METHOD, AND ASSIGNMENT PROGRAM

(71) Applicant: NIPPON TELEGRAPH AND TELEPHONE CORPORATION, Tokyo (JP)

(72) Inventors: Fumihiro Kanei, Musashino (JP); Mitsuaki Akiyama, Musashino (JP); Yuta Takata, Musashino (JP); Takeshi Yagi, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 186 days.

(21) Appl. No.: 16/484,827

(22) PCT Filed: Sep. 22, 2017

(86) PCT No.: PCT/JP2017/034354
§ 371 (c)(1),
(2) Date: Aug. 9, 2019

(87) PCT Pub. No.: WO2018/150619
PCT Pub. Date: Aug. 23, 2018

(65) Prior Publication Data
US 2020/0042695 A1 Feb. 6, 2020

(30) Foreign Application Priority Data
Feb. 14, 2017 (JP) .............................. JP2017-024901

(51) Int. Cl.
*G06F 11/00* (2006.01)
*G06F 12/14* (2006.01)
(Continued)

(52) U.S. Cl.
CPC ............ *G06F 21/51* (2013.01); *G06F 21/125* (2013.01); *G06F 21/14* (2013.01); *G06F 21/54* (2013.01); *G06F 21/64* (2013.01)

(58) Field of Classification Search
CPC ........ G06F 21/51; G06F 21/125; G06F 21/14; G06F 21/54; G06F 21/64; G06F 21/566; G06F 21/12
See application file for complete search history.

(56) References Cited

U.S. PATENT DOCUMENTS 5,333,280 A * 7/1994 Ishikawa ................. G06F 8/445
712/215
6,463,538 B1 10/2002 Elteto
(Continued)

FOREIGN PATENT DOCUMENTS

JP 2008-84275 A 4/2008
WO 2008/010508 A1 1/2008

OTHER PUBLICATIONS

Luo et al., Repackage-proofing Android Apps, 2016. (Year: 2016).*
(Continued)

*Primary Examiner* — Trong H Nguyen
(74) *Attorney, Agent, or Firm* — Xsensus LLP

(57) ABSTRACT

An extracting unit randomly extracts a block from among the blocks of instruction strings constituting the byte code of a first program and, at the time of execution of the first program, extracts the blocks which are invariably executed before the randomly-extracted block. A dividing unit randomly divides, into a plurality of blocks, the instruction strings constituting the byte code of a second program which enables detection of tampering of the first program. An inserting unit inserts the plurality of blocks, which are obtained by division by the dividing unit, at different positions in the block extracted by the extracting unit, while maintaining the execution sequence written in the second program.

4 Claims, 9 Drawing Sheets

(51) Int. Cl.
  *G06F 12/16* (2006.01)
  *G08B 23/00* (2006.01)
  *G06F 21/51* (2013.01)
  *G06F 21/12* (2013.01)
  *G06F 21/14* (2013.01)
  *G06F 21/54* (2013.01)
  *G06F 21/64* (2013.01)

(56) References Cited

U.S. PATENT DOCUMENTS

2009/0177873 A1* 7/2009 Sato ................ G06F 21/54
  712/233
2015/0278511 A1* 10/2015 Foley ............... G06F 21/53
  726/23

OTHER PUBLICATIONS

Extended European Search Report dated Aug. 14, 2020, issued in corresponding European Patent Application No. 17896598.4.
International Search Report and Written Opinion dated Dec. 26, 2017 for PCT/JP2017/034354 filed on Sep. 22, 2017, 8 pages including English Translation of the International Search Report.
Kanei et al., "Evaluating Resistance of Android Applications to Automated Repackaging", Transactions of Information Processing Society of Japan, vol. 56, No. 12, Dec. 15, 2015, pp. 2275-2288.
Protsenko et al., "Dynamic Self-Protection and Tamperproofing for Android Apps using Native Code", 2015 10th International Conference on Availability, Reliability and Security, IEEE, 2015, pp. 129-138.
Luo et al., "Repackage-proofing Android Apps", Proceedings of the 2016 46th Annual IEEE/IFIP International Conference on Dependable Systems and Networks (DSN), pp. 1-12.

* cited by examiner

FIG.2

```
 1  invoke-virtual {p0}, ... getPackageManager() ...
 2  move-result-object v2
 3  invoke-virtual {p0}, ... getPackageName() ...
 4  move-result-object v1
 5  const/4 v0, 0x0
 6  const/16 v5, 0x40
 7  invoke-virtual {v2, v1, v5}, ... getPackageInfo(...) ...
 8  move-result-object v0
 9  iget-object v5, v0, ... signatures:[Landroid/content/pm/Signature;
10  const/4 v6, 0x0
11  aget-object v3, v5, v6
12  invoke-virtual {v3}, ... hashCode() ...
13  move-result v4
14  const v5, -0x10e4a14f
15  if-eq v4, v5, :cond_0
16  invoke-static {}, ... detect() ...
17  :cond_0 return-void
```

FIG.4

```
1  invoke-virtual {p0}, ... getPackageManager() ...
2  move-result-object v2
3  invoke-virtual {p0}, ... getPackageName() ...
4  move-result-object v1
```
~132

```
5  const/4 v0, 0x0
```
~133

```
6  const/16 v5, 0x40
7  invoke-virtual {v2, v1, v5}, ... getPackageInfo(...) ...
8  move-result-object v0
```
~134

```
9   iget-object v5, v0, ... signatures:[Landroid/content/pm/Signature;
10  const/4 v6, 0x0
```
~135

```
11  aget-object v3, v5, v6
```
~136

```
12  invoke-virtual {v3}, ... hashCode() ...
13  move-result v4
```
~137

```
14  const v5, -0x10e4a14f
15  if-eq v4, v5, :cond_0
16  invoke-static {}, ... detect() ...
17  :cond_0 return-void
```
~138

ASSIGNMENT DEVICE, ASSIGNMENT METHOD, AND ASSIGNMENT PROGRAM

CROSS-REFERENCE TO RELATED APPLICATIONS

The present application is based on PCT filing PCT/JP2017/034354, filed Sep. 22, 2017, which claims priority to JP 2017-024901, filed Feb. 14, 2017, the entire contents of each are incorporated herein by reference.

FIELD

The present invention relates to an assignment device, an assignment method, and an assignment program.

BACKGROUND

Typically, a technology is known for assigning, to an application, a self-tampering detection function that enables detection of tampering of that application by an attacker. For example, a method is known in which the byte code of the application is encoded in the units of classes and, at the time of execution, a decoding routine performs byte code decoding and integrity verification as may be necessary for example, refer to Non Patent Literature 1). Moreover, for example, a method is known in which a number of execution codes are auto-inserted for performing integrity verification of the source code of an application, and the execution codes stochastically respond at the time of executing the application, so as to make it difficult for the attacker to disable all self-tampering detection codes (for example, refer to Non Patent Literature 2).

CITATION LIST

Patent Literature

Non Patent Literature 1: Mykola Protsenko, Sebastien Kreuter and Tilo Muller, "Dynamic Self-Protection and Tamperproofing for Android Apps using Native Code," in Proceedings of the International Conference on Availability, Reliability and Security (ARES), pp. 129-138, 2015.

Non Patent Literature 2: Lannan Luo, Yu Fu, Dinghao Wu, Sencun Zhu, and Peng Liu "Repackage-proofing Android Apps," in Proceedings of the International Conference on Dependable Systems and Networks (DSN), pp. 403-414, 2016.

SUMMARY

Technical Problem

However, in the conventional technology for assigning the self-tampering detection function, there are times when the location of implementation of the self-tampering detection function in a program is easily found by the attacker.

For example, in the method written in Non Patent Literature 1, since the location of implementation of integrity verification processing is a fixed position, there are times when that location is easily found. Moreover, for example, in the method written in Non Patent Literature 2, the self-tampering detection code is inserted in the units of lines of the source code. Hence, when the source code is compiled into a byte code, the block of same instruction strings appears at a plurality of locations at which the self-tampering detection code was inserted, and there are times when the block is easily found according to signature-based matching.

Solution to Problem

To solve a problem and to achieve an object, An assignment device that assigns, to a first program to be protected, a function enabling detection of tampering of the first program, the assignment device includes: an extracting unit that randomly extracts a block from among blocks of instruction strings constituting byte code of the first program and that, at time of execution of the first program, extracts blocks which are invariably executed before the randomly-extracted block; a dividing unit that randomly divides, into a plurality of blocks, instruction strings constituting byte code of a second program which enables detection of tampering of the first program; and an inserting unit that inserts the plurality of blocks, which are obtained by division by the dividing unit, at different positions in the block extracted by the extracting unit, while maintaining execution sequence written in the second program.

To solve a problem and to achieve an object, An assignment method implemented in an assignment device that assigns, to a first program to be protected, a function enabling detection of tampering of the first program, the assignment method includes: an extracting step that includes randomly extracting a block from among blocks of instruction strings constituting byte code of the first program and, at time of execution of the first program, extracting blocks which are invariably executed before the randomly-extracted block; a dividing step that includes randomly dividing, into a plurality of blocks, instruction strings constituting byte code of a second program which enables detection of tampering of the first program; and an inserting step that includes inserting the plurality of blocks, which are obtained by division at the dividing step, at different positions in the block extracted at the extracting step, while maintaining execution sequence written in the second program.

Advantageous Effects of Invention

According to the present invention, it becomes possible to ensure that the location of implementation of the self-tampering detection function in a program is not easily found by an attacker.

BRIEF DESCRIPTION OF DRAWINGS

FIG. 2 is a diagram illustrating a self-tampering detection code according to the first embodiment.

FIG. 4 is a diagram for explaining the division of the self-tampering detection code according to the first embodiment.

DESCRIPTION OF EMBODIMENTS

Figure 1:
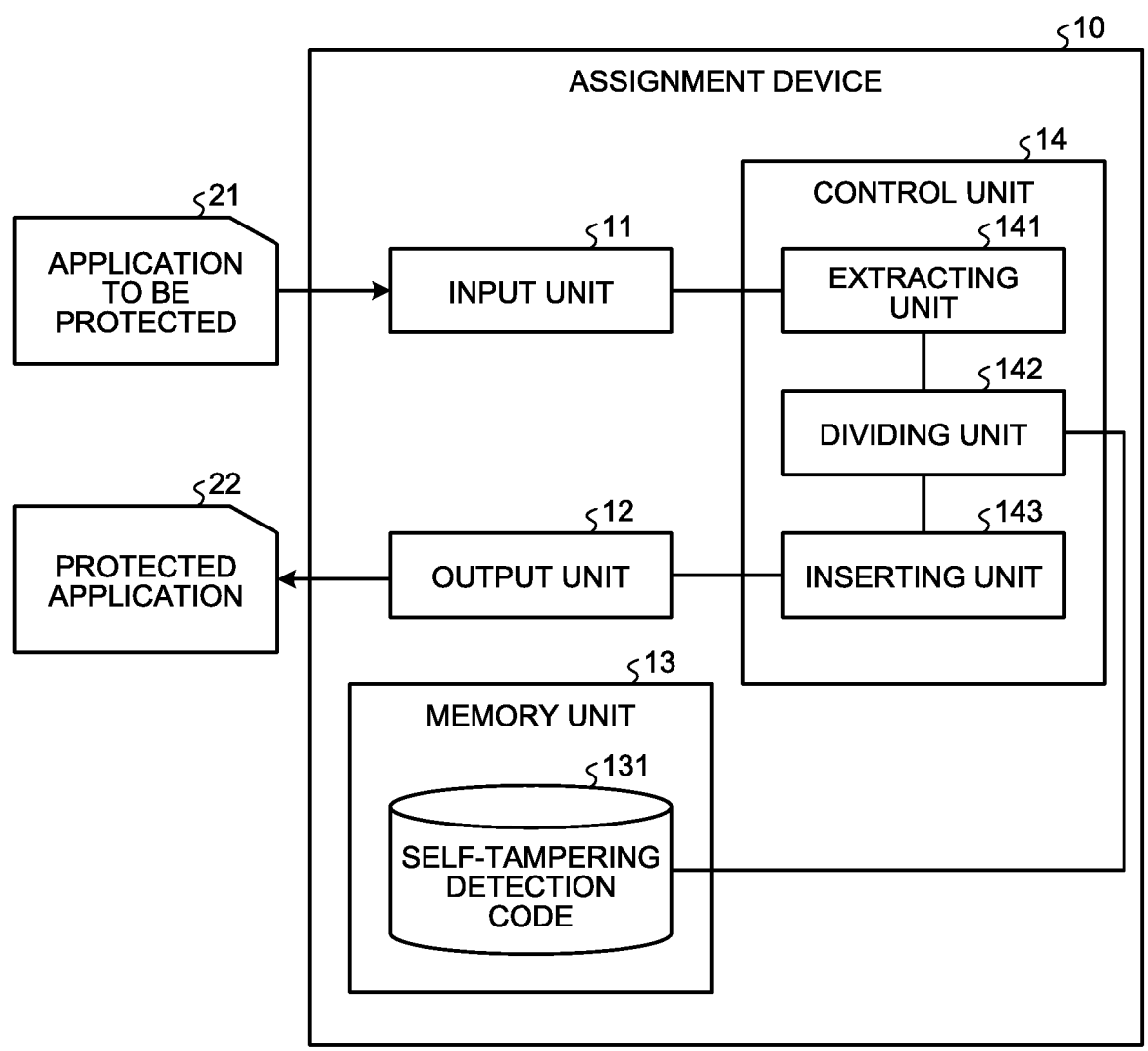
FIG. 1 is a diagram illustrating an exemplary configuration of an assignment device according to a first embodiment.

An exemplary embodiment of an assignment device, an assignment method, and an assignment program according to the application concerned is described below in detail with reference to the accompanying drawings. However, the present invention is not limited by the embodiment described below.

[Background of Present Invention]

Firstly, before describing the embodiment in detail, the explanation is given about the background of the present invention. According to the present invention, as the programs to be protected on account of being targeted for tampering, for example, there are applications executed in a cellular phone installed with Android (registered trademark). In Android, since the OS (Operating System) is an open-sourced OS having explicit specifications and since a large number of analysis tools have been released, tampering of applications is easy using reverse engineering.

An attacker tampers a legitimate application obtained from an application distribution site (hereinafter, called a "market"), and creates malware or a pirated application. For example, in a popular application obtained from a market, the attacker can insert a malicious code having the remote control functonality. As a result, although the application apparently functions as the original legitimate application, it can be turned into malware that performs malicious activities according to the instructions received behind the scenes from the attacker.

As a countermeasure against such tampering of an application, it is effective to assign a self-tampering detection function in advance to the application. The self-tampering detection implies the technology by which a program verifies its own integrity while being executed and detects tampering performed by a third person. In case any tampering is detected, the program is stopped from running and a warning is displayed to the user of the program, so that the tampered program is prevented from running in the user environment.

However, such countermeasures need to be voluntarily taken by the developer of an application and, at the time of implementing the self-tampering detection function in the application, it is required that the developer has the knowledge related to application tempering and has the capability of implementing the self-tampering detection function. Hence, depending on the security awareness and the implementation skills of individual developers, there are times when no such countermeasures are taken in the first place or there are times when the taken countermeasures are weak and the self-tampering detection function itself can be easily disabled by an attacker.

By taking into account such background, research has been going on regarding the technology by which a robust self-tampering detection function is assigned to an application in a fully-automatic manner. However, as explained earlier, according to the conventional technology, there are times when the location of implementation of the self-tampering detection function in a program can be easily found by an attacker. In that regard, it is an object of the present invention to resolve such issues.

More particularly, in the present invention, in order to make it more difficult to find the location of implementation of the self-tampering detection function, the self-tampering detection code is inserted in the units of byte code instructions having a finer granularity than the units of source code lines.

Moreover, in the present invention, as a result of automating the insertion of the self-tampering detection code, the assignment, of the self-tampering detection function is made possible regardless of the security awareness and the implementation skills of individual developers.

[Configuration According to First Embodiment]

Firstly, the explanation is given about a configuration of an assignment device according to a first embodiment of the present invention. FIG. 1 is a diagram illustrating an exemplary configuration of the assignment device according to the first embodiment. As illustrated in FIG. 1, an assignment device 10 includes an input unit 11, an output unit 12, a memory unit 13, and a control unit 14.

In the first embodiment, the explanation is given about an example in which the program to which the self-tampering detection function is to be assigned is an Android application. However, the program to be protected according to the present invention is not limited to an Android application, and alternatively a byte code or an arbitrary program convertible into a byte code can be treated as the program to be protected.

The input unit 11 receives input of data from the user. The input unit 11 is an input device such as a mouse or a keyboard. The output unit 12 outputs data by displaying it on a screen. The output unit 12 is a display device such as a display. Meanwhile, the input unit 11 and the output unit 12 can be configured as an interface for data input-output.

The input unit 11 receives input of an application. 21 to be protected. Herein, the application 21 to be protected is a byte code. Alternatively, the input unit 11 can receive input of the source code of an application. In that case, the assignment device 10 further includes a functional unit for converting the source code into a byte code. Meanwhile, the application 21 to be protected is an example of a first program.

The output unit 12 outputs a protected application 22. Herein, the protected application 22 is obtained as a result of assigning the self-tampering detection function to the application 21 to be protected.

The memory unit 13 is a memory device such as an HDD (Hard Disk Drive), a SSD (Solid State Drive), or an optical disk. Alternatively, the memory unit 13 can be a data-rewritable semiconductor memory such as a RAM (Random Access Memory), a flash memory, or an NVSRAM (Non Volatile Static Random Access Memory). The memory unit 13 is used to store the OS executed in the assignment device 10 and to store various programs. Moreover, the memory unit 13 is used to store a variety of information used in executing the programs. Furthermore, the memory unit 13 is used to store a self-tampering detection code 131.

The self-tampering detection code 131 is a template of a program having the self-tampering detection function implemented in advance. The memory unit 13 can be used to store a plurality of types of the self-tampering detection code 131.

Meanwhile, as long as the self-tampering detection function implemented in the self-tampering detection code 131 enables verification of the integrity of the application, it serves the purpose. For example, the self-tampering detection function can be configured to detect the tampering by comparing the value of the self-signature assigned to the application with a hardcoded value; or can be configured to detect the tampering by obtaining the hash value of the execution code and comparing that hash value with a hash value calculated in advance.

Explained below with reference to FIG. 2 is the self-tampering detection code 131. FIG. 2 is a diagram illustrating the self-tampering detection code according to the first embodiment. As illustrated in FIG. 2, the self-tampering detection code 131 is a byte code made of a plurality of lines. Herein, the self-tampering detection code 131 is an example of a second program.

The control unit 14 controls the entire assignment device 10. For example, the control unit 14 is an electronic circuit such as a CPU (Central Processing Unit) or an MPU (Micro Processing Unit); or an integrated circuit such as an ASIC (Application Specific Integrated Circuit) or an FPGA (Field Programmable Gate Array). The control unit 14 includes an internal memory for storing programs in which various processing sequences are defined and for storing control data, and performs various operations using the internal memory. Moreover, the control unit 14 functions as various types of processing units in response to the execution of various programs. For example, the control unit 14 includes an extracting unit 141, a dividing unit 142, and an inserting unit 143.

The extracting unit 141 randomly extracts a block from among blocks of instruction strings constituting the byte code of the application 21 to be protected; and, at the time of execution of the application 21 to be protected, extracts the blocks that are invariably executed before the randomly-extracted block.

More particularly, firstly, for each function included in the byte code of the application 21 to be protected, the extracting unit 141 builds a control flow graph. For example, a control flow graph can be built using an existing byte code analysis framework with the byte code of the application 21 to be protected serving as the input.

The extracting unit 141 randomly extracts, from the control flow graph corresponding to each function included in the application 21 to be protected, a source node; and extracts dominators representing the nodes that are invariably passed during the state transitions of the function from the start of execution till the source node, that is, extracts dominators representing the nodes present in the path from the start of execution of the function till the source node. The blocks of instruction strings constituting the byte code corresponding to the extracted source node and the extracted dominators represent insertion candidate locations for inserting the self-tampering detection code.

Figure 3:
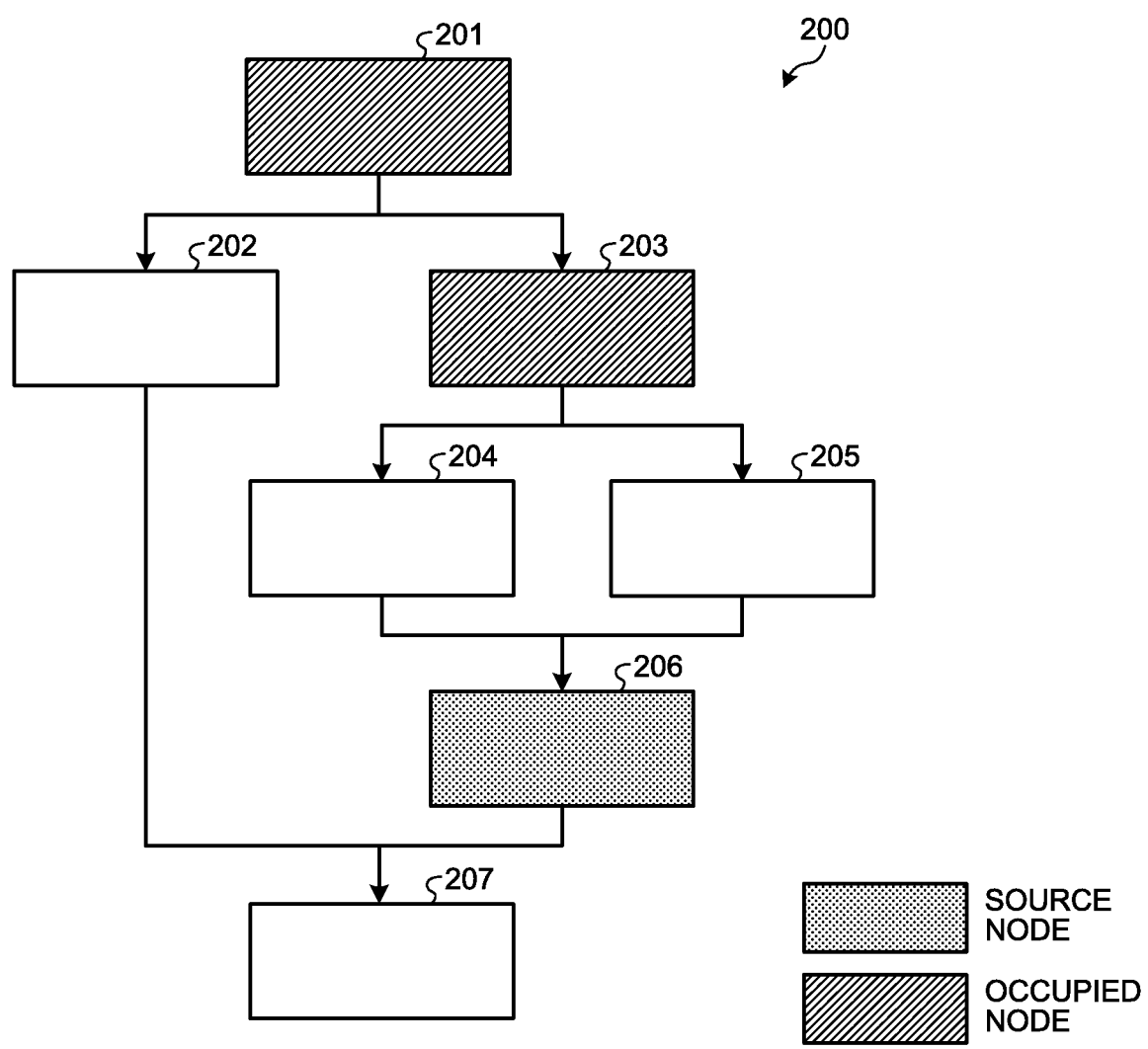
FIG. 3 is a diagram illustrating an example of a control flow graph according to the first embodiment.

Explained below with reference to FIG. 3 is the control flow graph. FIG. 3 is a diagram illustrating an example of the control flow graph according to the first embodiment. A control flow graph 200 is a control flow graph corresponding to a predetermined function included in the application 21 to be protected. As illustrated in FIG. 3, the control flow graph 200 includes nodes 201 to 207. The extracting unit 141 extracts the node 206 as the source node. Herein, the extracting unit 141 randomly decides about the node to be extracted as the source node.

Subsequently, the extracting unit 141 extracts, as the dominators, the nodes 201 and 203 representing the nodes that are invariably passed during the state transitions of the function from the start of execution till the source node. At the time of execution of the application 21 to be protected, in the case of state transition to the node 206, it is guaranteed that the nodes 201, 203, and 206 would be executed in that order. In that case, the insertion candidate locations for inserting the self-tampering detection code are included in the blocks of instruction strings constituting the byte code corresponding to the nodes 201, 203, and 206. Meanwhile, regarding all functions included in the application 21 to be protected, the extracting unit 141 extracts the source node and the dominators.

The dividing unit 142 randomly divides the instruction strings, which constitute the byte code of the self-tampering detection code 131 meant for detecting the tampering of the application 21 to be protected, into a plurality of blocks. Herein, the dividing unit 142 can perform the division while treating a single instruction in the self-tampering detection code 131, which is a byte code, as the smallest unit.

Moreover, the dividing unit 142 divides the self-tampering detection code 131 regarding each function for which the extracting unit 141 has extracted the source node and the dominators. Furthermore, the dividing unit 142 randomly decides, for each target function for division, the number of post-division blocks and the number of instructions of the byte code included in each block.

Explained below with reference to FIG. 4 is the division of the self-tampering detection code 131. FIG. 4 is a diagram for explaining the division of the self-tampering detection code according to the first embodiment. In FIG. 4 is illustrated an example of the division of the self-tampering detection code 131 illustrated in FIG. 4. In the self-tampering detection code 131, each line from the first line to the 17-th line represents a single instruction string. Herein, for the purpose of illustration, the self-tampering detection code 131 is an edited version of the actual self-tampering detection code. In the example illustrated in FIG. 4, the dividing unit 142 divides the self-tampering detection code 131 into seven blocks, namely, blocks 132 to 138.

Herein, the dividing unit 142 can perform the division in such a way that, from among the instruction strings constituting the byte code of the self-tampering detection code 131, a plurality of successive instruction strings satisfying a predetermined condition is included in the same block. For example, the dividing unit 142 performs the division in such a way that the instruction strings that need to be executed in succession or the instruction strings that are executed depending on conditional branching are included in the same block. Thus, due to the division performed by the dividing unit 142, the behavior of the operations executed by the self-tampering detection code 131 is prevented from becoming different than the assumed behavior.

For example, as the predetermined condition, it is possible to set that the instruction string starting with "invoke-virtual" is followed by the instruction string starting with "move-result". In that case, in the example illustrated in FIG. 4, the dividing unit 142 performs the division in such a way that, for example, the instruction strings in the first and second lines are included in the block 132. Thus, the instruction strings in the first and second lines represent an example of the instruction strings that need to be executed in succession.

Alternatively, as the predetermined condition, it is possible to set that the instruction strings are included in between "if-" and "return-void". In that case, in the example illustrated in FIG. 4, the dividing unit 142 performs the division in such a way that, for example, the instruction strings from the 15-th line to the 17-th line are included in the block 138. Thus, the instruction strings from the 15-th line to the 17-th line represent an example of the instruction strings that are executed depending on conditional branching.

The inserting unit 143 inserts a plurality of blocks, which are obtained by division by the dividing unit 142, at different positions in the block extracted by the extracting unit 141, while maintaining the execution sequence written in the self-tampering detection code 131. More particularly, regarding each control flow graph, the inserting unit 143 inserts a plurality of blocks, which are obtained by division by the dividing unit 142, at different positions in the block of the byte code corresponding to the source node and the dominators, that is, at the insertion candidate locations for the self-tampering detection code 131.

Regarding the insertion positions for inserting a plurality of blocks obtained by division by the dividing unit 142, the inserting unit 143 can randomly decide on the insertion positions from among the insertion candidate locations. However, the inserting unit 143 inserts the blocks in such a way that the execution sequence of the inserted blocks is same as the execution sequence written in the self-tampering detection code 131.

Figure 5:
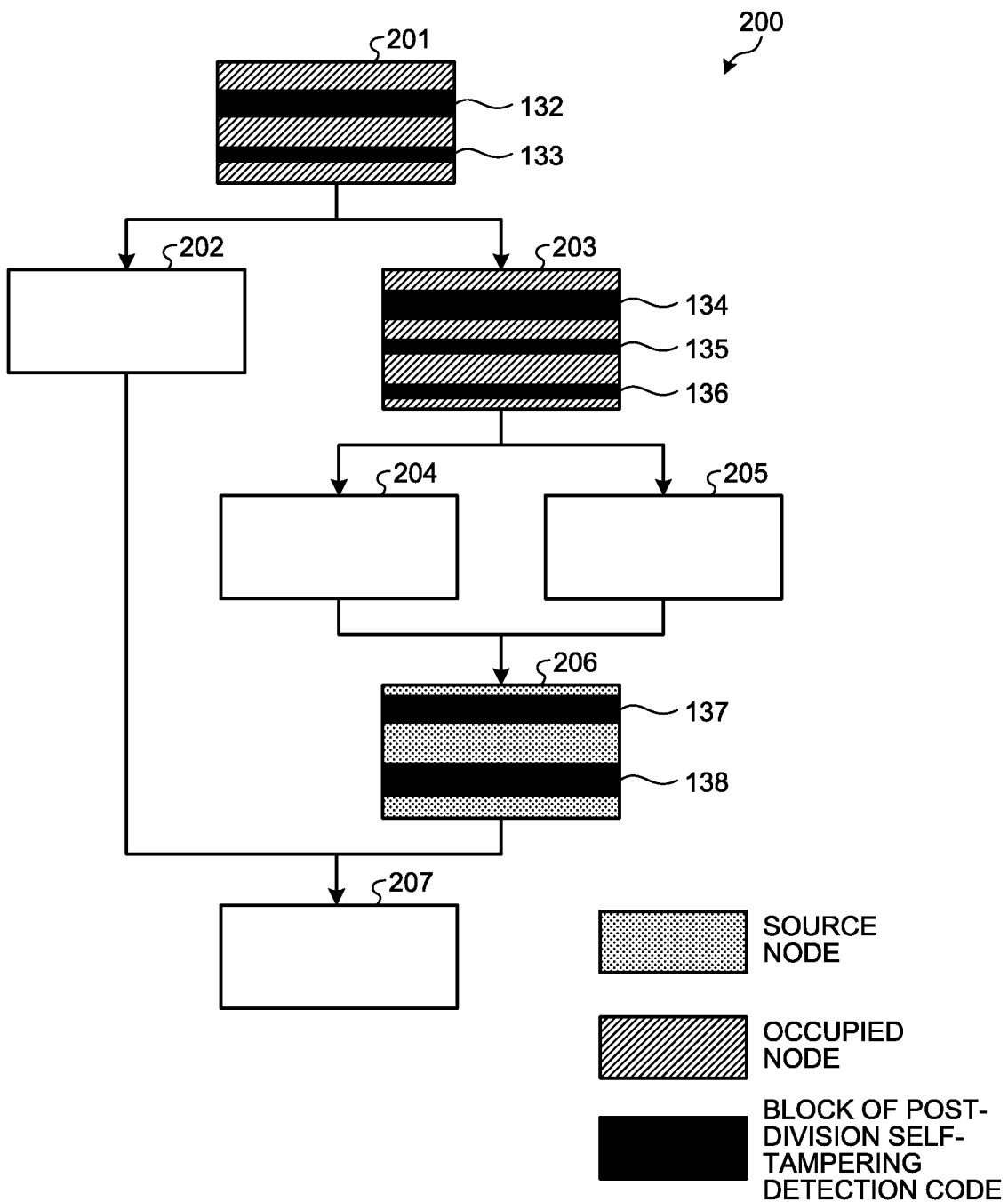
FIG. 5 is a diagram for explaining the insertion of the self-tampering detection code according to the first embodiment.

Explained below with reference to FIG. 5 is the insertion of the self-tampering detection code 131. FIG. 5 is a diagram for explaining the insertion of the self-tampering detection code according to the first embodiment. In the example illustrated in FIG. 5, firstly, the inserting unit 143 decides two positions in the node 201 as the insertion positions. Then, according to the execution sequence written in the self-tampering detection code 131, the inserting unit 143 inserts the block 132 at the position that, of the two positions, comes first during the execution and inserts the block 133 at the position that comes second during the execution. In an identical manner, the inserting unit 143 inserts the blocks 134 to 136 at three positions in the node 203, and inserts the blocks 137 and 138 at two positions in the node 206.

At the time of inserting a plurality of blocks obtained by division by the dividing unit 142, the inserting unit 143 at least either adds exception handling or secures a variable storage area. For example, if a code causing an exception is included in a post-division block, then the inserting unit 143 inserts that block as well as inserts a code for exception handling. Moreover, if temporary variables are used in a post-division block, then the inserting unit 143 modifies that block so as to either use the unused variable storage area available in the original byte code or use a newly-added variable storage area.

Meanwhile, the memory unit 13 can have a plurality of types of the self-tampering detection code 131 stored therein. In that case, the inserting unit 143 can insert a different type of self-tampering detection code 131 for each function.

[Operations According to First Embodiment]

Figure 6:
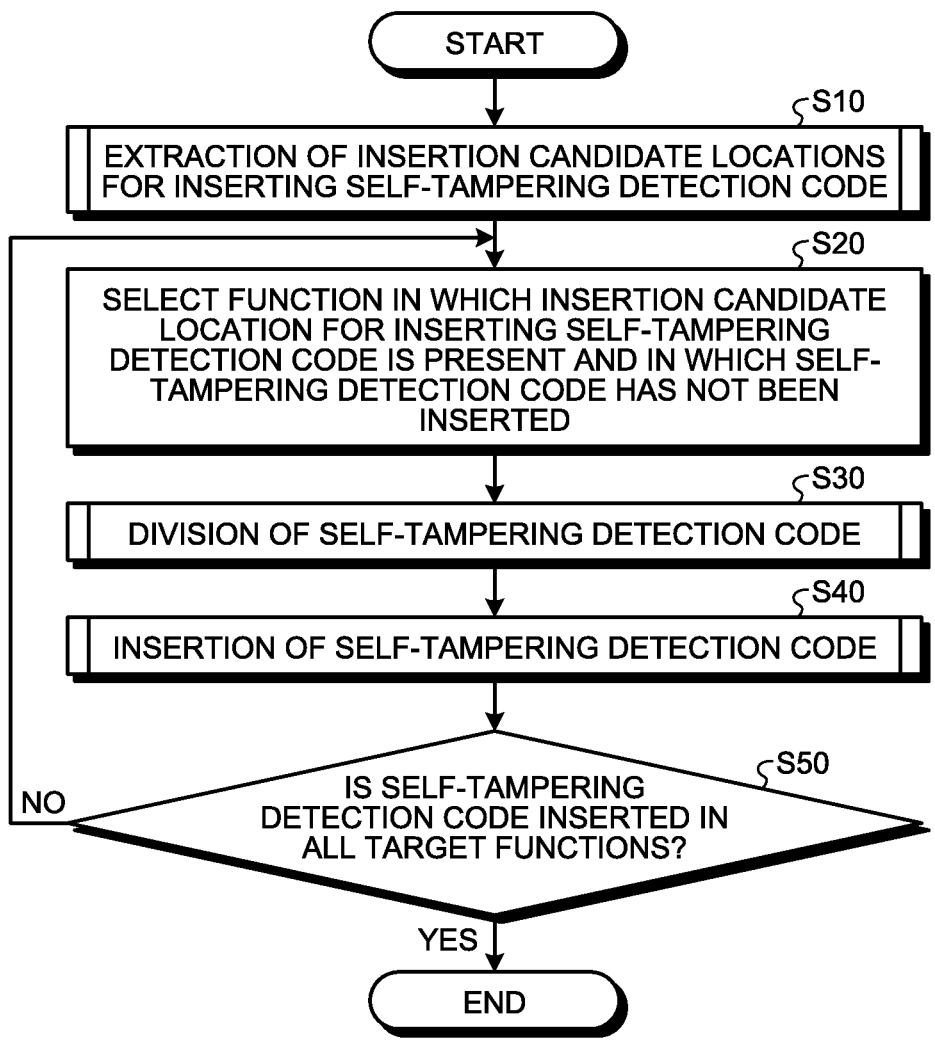
FIG. 6 is a flowchart for explaining the overall flow of operations performed in the assignment device according to the first embodiment.

Explained below with reference to FIGS. 6 to 9 are the operations performed in the assignment device 10. Firstly, explained below with reference to FIG. 6 is the overall flow of operations performed in the assignment device 10. FIG. 6 is a flowchart for explaining the overall flow of operations performed in the assignment device according to the first embodiment.

As illustrated in FIG. 6, firstly, the extracting unit 141 extracts the insertion candidate locations for inserting the self-tampering detection code 131 (Step S10). The inserting unit 143 selects, from the byte code of the application 21 to be protected, such a function in which an insertion candidate location for inserting the self-tampering detection code 131 is present and in which the self-tampering detection code 131 has not been inserted (Step S20). Then, the dividing unit 142 divides the self-tampering detection code 131 (Step S30). Subsequently, the inserting unit 143 inserts the self-tampering detection code 131, which has been divided by the dividing unit 142, in the selected function (Step S40).

If there is any target function in which the self-tampering detection code 131 has not been inserted (No at. Step S50), then the assignment device 10 again performs the operations from Step S20 to Step S40. When the self-tampering detection code 131 is inserted in all target functions (Yes at Step S50), the assignment device 10 ends the operations. After that, the assignment device 10 becomes able to output the byte code of the protected application. 22.

Figure 7:
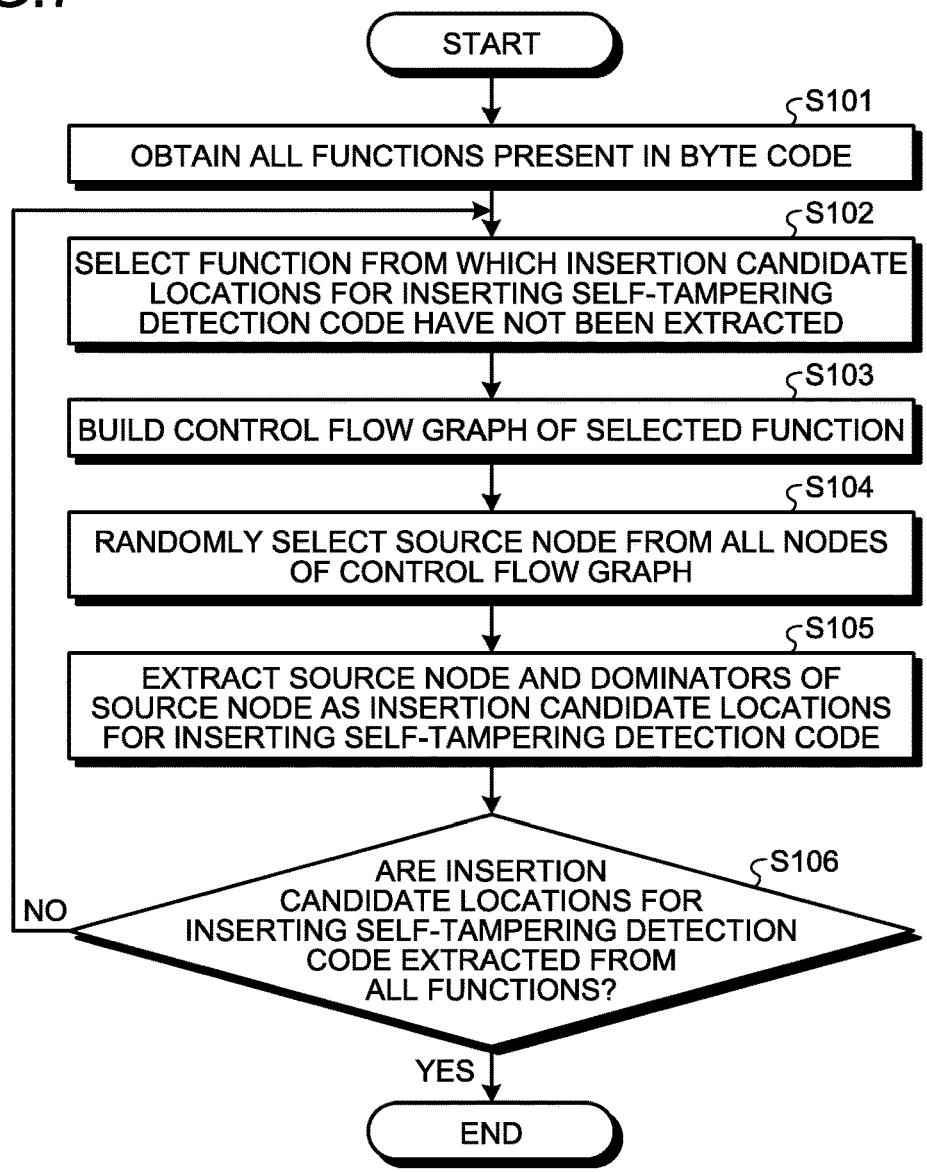
FIG. 7 is a flowchart for explaining the flow of operations performed during an extraction operation in the assignment device according to the first embodiment.

Explained below in detail with reference to FIG. 7 is the extraction operation by which the extracting unit 141 extracts the insertion candidate locations for inserting the self-tampering detection code 131 (Step S10). FIG. 7 is a flowchart for explaining the flow of operations performed during the extraction operation in the assignment device according to the first embodiment.

As illustrated in FIG. 7, firstly, the extracting unit 141 obtains all functions present in the byte code of the application 21 to be protected (Step S101). Then, the extracting unit 141 selects a function from which the insertion location candidates for inserting the self-tampering detection code 131 have not been extracted (Step S102). Subsequently, the extracting unit 141 builds a control flow graph of the selected function (Step S103).

Then, the extracting unit 141 randomly selects the source node from among all nodes present in the control flow graph (Step S104). Subsequently, the extracting unit 141 extracts the source node and the dominators of the source node as the insertion candidate locations for inserting the self-tampering detection code 131 (Step S105).

If there is any function from which the insertion candidate locations for inserting the self-tampering detection code 131 have not been extracted (No at Step S106), then the extracting unit 141 again performs the operations from Step S102 to Step S105. On the other hand, when the insertion candidate locations for inserting the self-tampering detection code 131 is extracted from all functions, the extracting unit 141 ends the operations (Yes at Step S106).

Figure 8:
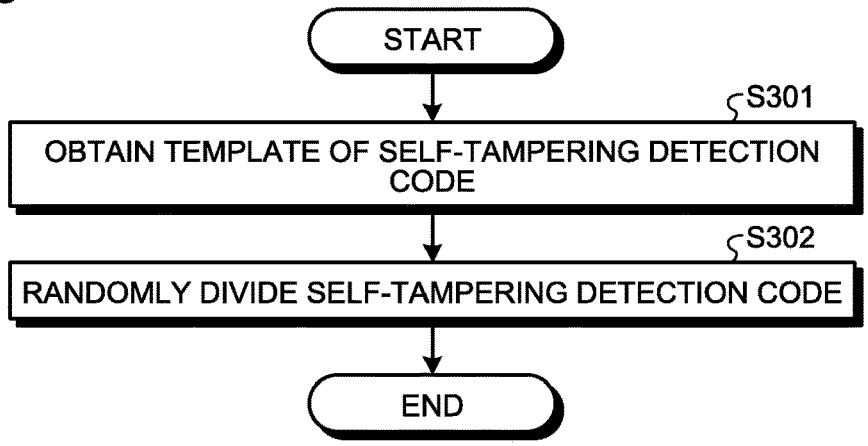
FIG. 8 is a flowchart for explaining the flow of operations performed during a division operation in the assignment device according to the first embodiment.

Explained below in detail with reference to FIG. 8 is the division operation by which the dividing unit 142 divides the self-tampering detection code 131 (Step S30). FIG. 8 is a flowchart for explaining the flow of operations performed during the division operation in the assignment device according to the first embodiment.

As illustrated in FIG. 8, firstly, the dividing unit 142 obtains the self-tampering detection code 131 that is stored as a template (Step S301). Then, the dividing unit 142 randomly divides the self-tampering detection code 131 into a plurality of blocks (Step S302).

Figure 9:
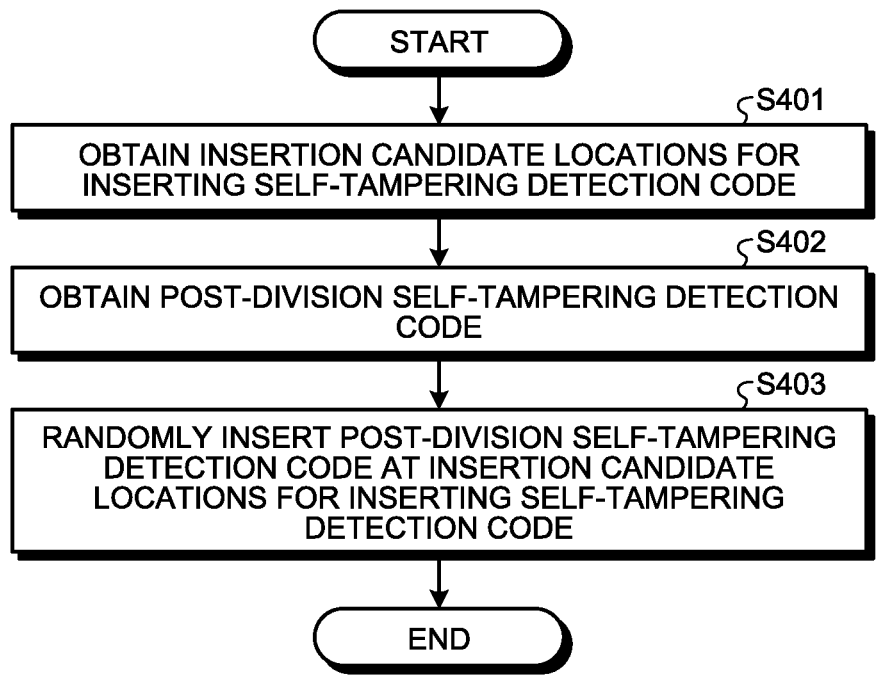
FIG. 9 is a flowchart for explaining the flow of operations performed during an insertion operation in the assignment device according to the first embodiment.

Explained below in detail with reference to FIG. 9 is the insertion operation by which the dividing unit 142 inserts the self-tampering detection code 131 (Step S40). FIG. 9 is a flowchart for explaining the flow of operations performed during the insertion operation in the assignment device according to the first embodiment.

As illustrated in FIG. 9, firstly, the inserting unit 143 obtains the insertion candidate locations that are meant for inserting the self-tampering detection code 131 and that are extracted by the extracting unit 141 (Step S401). Then, the inserting unit 143 obtains the post-division self-tampering detection code 131 obtained by division by the dividing unit 142 (Step S402). Subsequently, the inserting unit 143 inserts the post-division self-tampering detection code 131 at the insertion candidate locations for inserting the self-tampering detection code (Step S403).

[Effect of First Embodiment]

The extracting unit 141 randomly extracts a block from among blocks of instruction strings constituting the byte code of the first program; and, at the time of execution of the first program, extracts the blocks that are invariably executed before the randomly-extracted block. Moreover, the dividing unit 142 randomly divides the instruction strings, which constitute the byte code of the second program meant for detecting the tampering of the first program, into a plurality of blocks. Furthermore, the inserting unit 143 inserts a plurality of blocks, which are obtained by division by the dividing unit 142, at different positions in the block extracted by the extracting unit 141, while maintaining the execution sequence written in the second program.

At the time of execution of the first program, that is, the program to be protected, it is ensured that the blocks extracted by the extracting unit 141 are invariably executed according to the sequence. Hence, when the second program, that is, the self-tampering detection code is inserted, the blocks can be executed according to the sequence without exception.

Moreover, for each function included in the program to be protected, the self-tampering detection code is inserted after being divided in a random manner, thereby making it difficult to mechanically find out the entire self-tampering detection code. As a result, according to the first embodiment, it becomes possible to ensure that the location of implementation of the self-tampering detection function in a program is not easily found by an attacker.

Furthermore, from the control flow graph of each function included in the first program, the extracting unit 141 can randomly extract the source node and then extract the dominators representing the nodes present in the path from the start of execution of the function till the source node. At that time, regarding each control flow graph, the inserting unit 143 inserts a plurality of blocks, which are obtained by division by the dividing unit 142, at different positions in the block of the byte code corresponding to the source node and the dominators. A control flow graph can be built using an existing byte code analysis frame work. Hence, according to the first embodiment, it becomes possible to automate the insertion of the self-tampering detection code, and to enable assignment of the self-tampering detection function regardless of the security awareness and the implementation skills of individual developers.

Moreover, the dividing unit 142 can perform the division in such a way that, from among the instruction strings constituting the byte code of the second program, a plurality of successive instruction strings satisfying a predetermined condition is included in the same block. Thus, due to the division of the self-tampering detection code, the behavior of the self-tampering detection operation executed in the protected program is prevented from becoming different than the assumed behavior.

At the time of inserting a plurality of blocks obtained by division by the dividing unit 142, the inserting unit 143 at least either adds exception handling or secures a variable storage area. Thus, due to the insertion of blocks by the inserting unit 143, it becomes possible to prevent inconsistency in the execution of the protected application 22.

[System Configuration]

The constituent elements of the device illustrated in the drawings are merely conceptual, and need not be physically configured as illustrated. The constituent elements, as a whole or in part, can be separated or integrated either functionally or physically based on various types of loads or use conditions. The process functions performed by the device are entirely or partially implemented using the CPU or computer programs that are analyzed and executed by the CPU, or implemented as hardware using wired logic.

Of the processes described in the embodiment, all or part of the processes explained as being performed automatically can be performed manually. Similarly, all or part of the processes explained as being performed manually can be performed automatically by a known method. The processing procedures, the control procedures, specific names, various data, and information including parameters described in the embodiment or illustrated in the drawings can be changed as required unless otherwise specified.

[Program]

As an illustrative embodiment, the assignment device 10 can be implemented by installing an assignment program, which is meant for assigning the self-tampering detection function as package software or online software, in an intended computer. For example, by executing the assignment program in an information processing device, the information processing device can be made to function as the assignment device 10. The information processing device can be a desktop personal computer or a notebook-size personal computer. Besides, the information processing device can be a mobile communication terminal such as a smartphone, a cellular phone, or a PHS (Personal Handy-phone System); or can be a slate terminal such as a PDA (Personal Digital Assistant).

Alternatively, a terminal device used by a user can be treated as the client device, and the assignment device 10 can be implemented as an assignment server device for providing, to the client device, the services related to the assignment of the self-tampering detection function. For example, the assignment server device is implemented as a server device that provides an assignment service in which the byte code of the program to be protected is treated as the input and the protected program is treated as the output. In that case, the assignment server device can be implemented as a Web server, or can be implemented as a cloud server for providing, by outsourcing, the services related to the assignment of the self-tampering detection function.

Figure 10:
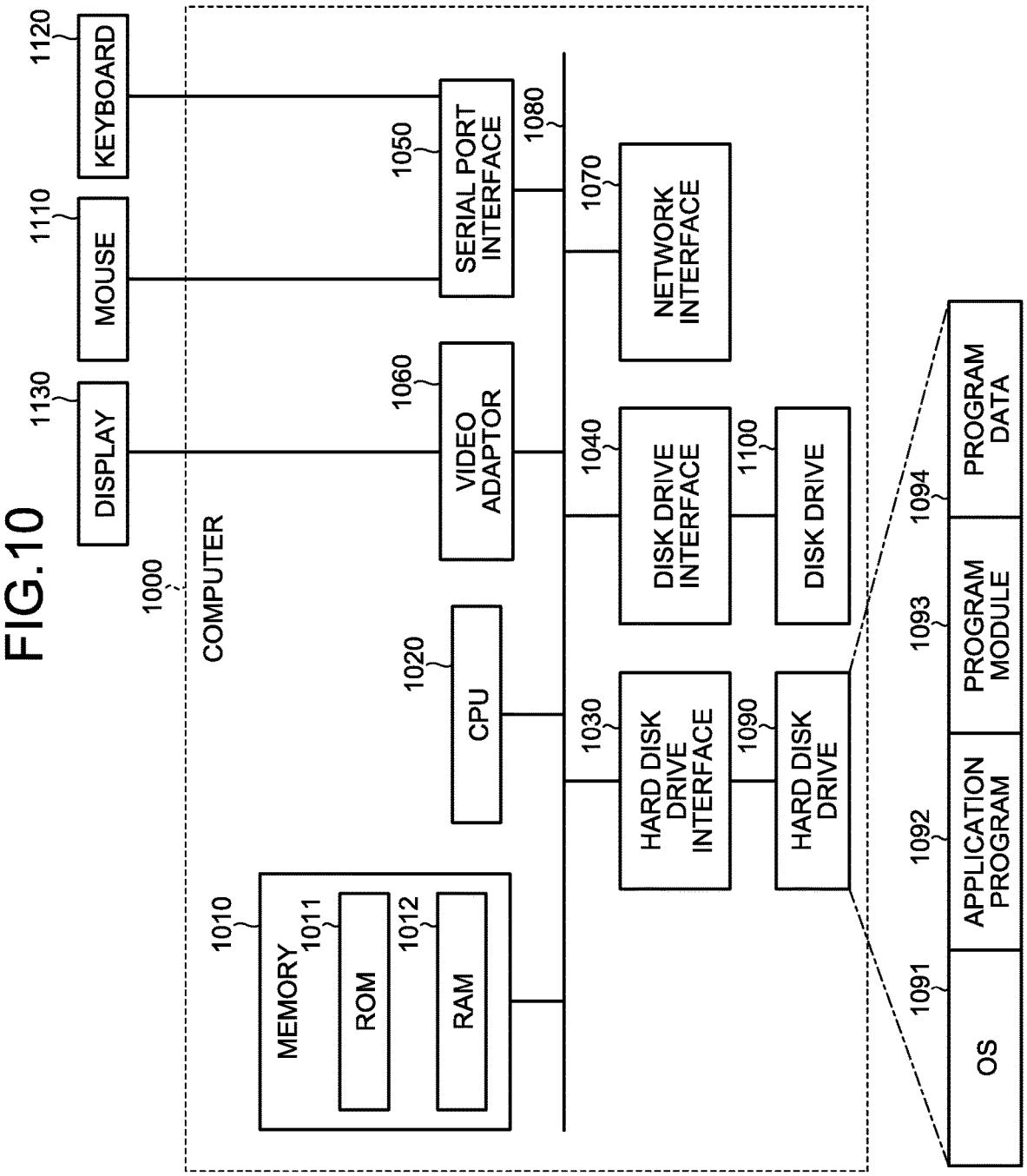
FIG. 10 is a diagram illustrating an example of a computer in which the assignment device is implemented as a result of execution of a program.

FIG. 10 is a diagram illustrating an example of a computer in which the assignment device is implemented as a result of execution of a program. A computer 1000 includes, for example, a memory 1010 and a CPU 1020. Moreover, the computer 1000 includes a hard disk drive interface 1030, a disk drive interface 1040, a serial port interface 1050, a video adaptor 1060, and a network interface 1070. These constituent elements are connected to each other by a bus 1080.

The memory 1010 includes a ROM (Read Only Memory) 1011 and a RAM 1012. The ROM 1011 is used to store a boot program such as the BIOS (Basis input Output System). The hard disk drive interface 1030 is connected to a hard disk drive 1090. The disk drive interface 1040 is connected to a disk drive 1100. For example, a detachably-attachable memory medium such as a magnetic disk or an optical disk is inserted in the disk drive 1100. The serial port interface 1050 is connected to, for example, a mouse 1110 and a keyboard 1120. The video adaptor 1060 is connected to, for example, a display 1130.

The hard disk drive 1090 is used to store, for example, an OS 1091, an application program. 1092, a program module 1093, and program data 1094. That is, the program that defines the operations of the assignment device 10 is implemented as the program module 1093 in which a computer-executable code is written. The program module 1093 is stored in, for example, the hard disk drive 1090. For example, the program module 1093 that is meant for performing identical operations to the functional configuration of the assignment device 10 is stored in the hard disk drive 1090. Meanwhile, the hard disk drive 1090 can be substituted with an SSD.

Meanwhile, the setting data used in the operations according to the embodiment is stored as the program data 1094 in, for example, the memory 1010 or the hard disk drive 1090. The CPU 1020 reads, as may be necessary, the program module 1093 and the program data 1094, which is stored in the memory 1010 or the hard disk drive 1090, into the RAM 1012 and executes the program module 1093.

The program module 1093 and the program data 1094 need not always be stored in the hard disk drive 1090. Alternatively, for example, the program module 1093 and the program data 1094 can be stored in a detachably-attachable memory medium, and the CPU 1020 can read the program module 1093 and the program data 1094 via the disk drive 1100. Still alternatively, the program module 1093 and the program data 1094 can be stored in another computer that is connected via a network (such as a LAN (Local Area Network) or a WAN (Wide Area Network)). Then, the CPU 1020 can read the program module 1093 and the program data 1094 from the other computer via the network interface 1070.

REFERENCE SIGNS LIST

10 assignment device
11 input unit
12 output unit
13 memory unit
14 control unit
21 application to be protected
22 protected application
131 self-tampering detection code
132, 133, 134, 135, 136, 137, 138 block
141 extracting unit
142 dividing unit
143 inserting unit
200 control flow graph
201, 202, 203, 204, 205, 206, 207 node

The invention claimed is:

1. An assignment device that assigns, to a first program to be protected, a function enabling detection of tampering of the first program, the assignment device comprising:
a memory; and
a processor coupled to the memory and programmed to execute a process comprising:
randomly extracting a block from among blocks of instruction strings constituting byte code of the first program and, at time of execution of the first program, extracting blocks which are invariably executed before the randomly-extracted block;
dividing, into a plurality of blocks, instruction strings constituting byte code of a second program which enables the detection of tampering of the first program; and
inserting the plurality of blocks, which are obtained by division at the dividing, at different positions in the randomly extracted block and the extracted blocks, while maintaining execution sequence written in the second program, wherein
the inserting inserts a self-tampering detection code, as the second program, in units of byte code instructions having a finer granularity than units of source code lines,
the dividing performs the division to have a plurality of successive instruction strings, from among the instruction strings constituting the byte code of the second program, included in a same block,
the plurality of successive instruction strings needs to be executed in succession,
from control flow graph of each function included in the first program, the randomly extracting randomly extracts source node, and the extracting the blocks extracts dominators representing nodes present in path from start of execution of the each function till the source node,
regarding each control flow graph, the inserting inserts the plurality of blocks, which are obtained by the division by the dividing, at different positions in byte code of the extracted source node and at different positions in byte code of each of the extracted dominators, and
blocks of instruction strings constituting the byte code of the extracted source node and the byte code of each of the extracted dominators represent insertion candidate locations for inserting the self-tampering detection code.

2. The assignment device according to claim 1, wherein, at time of inserting the plurality of blocks obtained by the division by the dividing, the inserting at least either adds exception handling or secures a variable storage area.

3. An assignment method implemented in an assignment device that assigns, to a first program to be protected, a function enabling detection of tampering of the first program, the assignment method comprising:
randomly extracting a block from among blocks of instruction strings constituting byte code of the first program and, at time of execution of the first program, extracting blocks which are invariably executed before the randomly-extracted block;
dividing, into a plurality of blocks, instruction strings constituting byte code of a second program which enables the detection of tampering of the first program; and
inserting the plurality of blocks, which are obtained by division at the dividing, at different positions in the randomly extracted block and the extracted blocks, while maintaining execution sequence written in the second program, wherein
the inserting inserts a self-tampering detection code, as the second program, in units of byte code instructions having a finer granularity than units of source code lines,
the dividing performs the division to have a plurality of successive instruction strings, from among the instruction strings constituting the byte code of the second program, included in a same block,
the plurality of successive instruction strings need to be executed in succession,
from control flow graph of each function included in the first program, the randomly extracting randomly extracts source node, and the extracting the blocks extracts dominators representing nodes present in path from start of execution of the each function till the source node, regarding each control flow graph, the inserting inserts the plurality of blocks, which are obtained by the division by the dividing, at different positions in byte code of the extracted source node and at different positions in byte code of each of the extracted dominators, and blocks of instruction strings constituting the byte code of the extracted source node and the byte code of each of the extracted dominators represent insertion candidate locations for inserting the self-tampering detection code.

4. A non-transitory computer-readable recording medium having stored therein a program, for assigning, to a first program to be protected, a function enabling detection of tampering of the first program, that causes a computer to execute a process, comprising:

randomly extracting a block from among blocks of instruction strings constituting byte code of the first program and, at time of execution of the first program, extracting blocks which are invariably executed before the randomly-extracted block;

dividing, into a plurality of blocks, instruction strings constituting byte code of a second program which enables the detection of tampering of the first program; and inserting the plurality of blocks, which are obtained by division at the dividing, at different positions in the randomly extracted block and the extracted blocks, while maintaining execution sequence written in the second program, wherein the inserting inserts a self-tampering detection code, as the second program, in units of byte code instructions having a finer granularity than units of source code lines, the dividing performs the division to have a plurality of successive instruction strings, from among the instruction strings constituting the byte code of the second program, included in a same block, the plurality of successive instruction strings need to be executed in succession, from control flow graph of each function included in the first program, the randomly extracting randomly extracts source node, and the extracting the blocks extracts dominators representing nodes present in path from start of execution of the each function till the source node, regarding each control flow graph, the inserting inserts the plurality of blocks, which are obtained by the division by the dividing, at different positions in byte code of the extracted source node and at different positions in byte code of each of the extracted dominators, and the blocks of instruction strings constituting the byte code of the extracted source node and the byte code of each of the extracted dominators represent insertion candidate locations for inserting the self-tampering detection code.

\* \* \* \* \*